United States Patent [19]

Peter

[11] Patent Number: 4,750,460
[45] Date of Patent: Jun. 14, 1988

[54] METHOD FOR DETECTING FLUCTUATIONS IN THE ROTATIONAL SPEED OF AN INTERNAL COMBUSTION ENGINE

[75] Inventor: Cornelius Peter, Ottersweier, Fed. Rep. of Germany

[73] Assignee: Robert Bosch GmbH, Stuttgart, Fed. Rep. of Germany

[21] Appl. No.: 877,096

[22] Filed: Jun. 20, 1986

[30] Foreign Application Priority Data

Jul. 6, 1985 [DE] Fed. Rep. of Germany ....... 3524269

[51] Int. Cl.$^4$ ............................................ F02D 11/10
[52] U.S. Cl. ..................................... 123/339; 123/479
[58] Field of Search ...................... 123/339, 352, 479

[56] References Cited

U.S. PATENT DOCUMENTS

| | | | |
|---|---|---|---|
| 4,380,979 | 4/1983 | Takase | 123/339 |
| 4,509,477 | 4/1985 | Takao | 123/339 |
| 4,513,711 | 4/1985 | Braun | 123/339 |
| 4,635,601 | 1/1987 | Cornelius | 123/339 |

Primary Examiner—Ronald B. Cox
Attorney, Agent, or Firm—Walter Ottesen

[57] ABSTRACT

The invention discloses a method for detecting rotational speed fluctuations of an internal combustion engine, wherein in a first step it is checked whether the actual speed of the internal combustion engine deviates from a predeterminable desired speed by more than a predeterminable amount. In a second step, it is checked whether the time distance between two successive overtravels exceeds a predeterminable period of time; and, in a third step, it is finally determined that the rotational speed of the internal combustion engine is fluctuating if this time distance is less than the predetermined period of time. The method of the invention permits the rotational speed fluctuations of an internal combustion engine to be detected reliably while at the same time requiring little storage space and little computing time when realized by means of a computer.

5 Claims, 1 Drawing Sheet

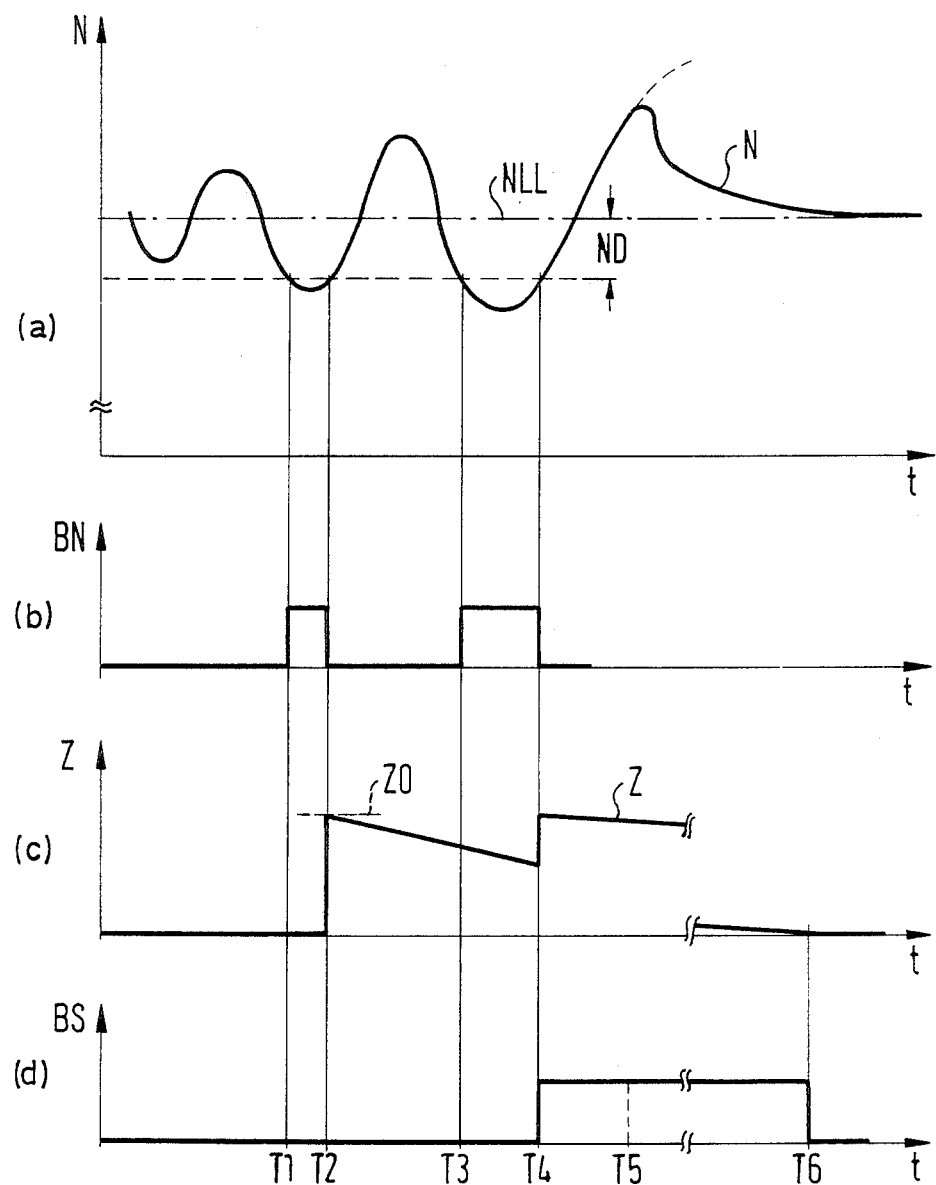

METHOD FOR DETECTING FLUCTUATIONS IN THE ROTATIONAL SPEED OF AN INTERNAL COMBUSTION ENGINE

FIELD OF THE INVENTION

The invention relates to a method for detecting fluctuations in the rotational speed of an internal combustion engine.

BACKGROUND OF THE INVENTION

U.S. Pat. No. 4,513,711 and U.S. patent application Ser. No. 783,758 filed on Oct. 3, 1985 disclose that possible rotational speed fluctuations of an internal combustion engine can be detected by means of apparatus for detecting jerk-like movements and measuring and evaluating devices. With these arrangements, the course of the rotational speed of the engine is evaluated, and fluctuations of the engine speed are established in dependence on the frequency and the intensity of rotational speed changes. This method is very complex, requiring much computing time and storage space if realized, for example, by means of a suitable programmed computer.

SUMMARY OF THE INVENTION

By contrast with the known state of the art, the method for detecting rotational speed fluctuations of an internal combustion engine as disclosed in the invention affords the advantage of being of simple structure and therefore requiring little computing time if realized by means of a computer. Its structural simplicity notwithstanding, the method of the invention reliably detects any speed fluctuations of the internal combustion engine, with the parameters for establishing when a rotational speed is to be considered fluctuating being freely selectable.

Further advantageous embodiments and improvements of the method of the invention will become apparent from the subsequent description, in conjunction with the drawing and from the claims.

BRIEF DESCRIPTION OF THE DRAWING

The method of the invention will now be described with reference to the drawing, the sole FIGURE of which shows four time diagrams (a) to (d).

DESCRIPTION OF THE PREFERRED EMBODIMENT OF THE INVENTION

The drawing shows four diagrams each plotting a signal against the time t. In the first diagram (a), the signal shown is the rotational speed N of the internal combustion engine; in the second diagram (b), it is a binary signal BN; in the third diagram (c), a count signal Z is shown; and, in the fourth diagram (d), a binary signal BS is depicted.

In diagram (a), in which the rotational speed N of the internal combustion engine is plotted as a function of time t, the idle speed NLL of the engine is also shown and a rotational speed spacing ND is identified. Similarly, in diagram (c), in which the count signal Z is plotted as a function of time t, an initial count value Z0 is shown. Finally, a total of six time points T1 to T6 are shown on the time axis of the lowermost diagram (d).

If the rotational speed N of the internal combustion engine follows the pattern shown in diagram (a), it drops below the rotational speed value (NLL−ND) at respective time points T1 and T3 and exceeds these values again at respective time points T2 and T4. As a result of this deviation of the actual engine speed N from the idle speed NLL by the rotational speed difference value ND, the binary signal BN becomes a high signal level between the time points T1 and T2 and between the time points T3 and T4. With every transition of the binary signal BN from a high signal level to a low signal level, the count signal Z will be set to a predeterminable initial condition Z0. Simultaneously with each setting of the initial condition Z0, the count signal Z will start to decrease slowly. On the one hand, this may be a continuous process as shown in diagram (c) or, in the event that the count signal Z is realized with the aid of a counter, it can become less by decrementing in steps.

Before the count signal Z is set to the initial condition Z0, in each instance, it will be checked whether the count signal Z is equal or unequal to zero. If the count signal Z is equal to zero prior to being reset to Z0, the binary signal BS will not be changed. This is the case at time point T2, for example. However, if the count signal Z is unequal to zero prior to being reset to Z0, the binary signal BS will be set to a high signal level as is the case at time point T4, for example. The transition of binary signal BS from a low level to a high level signifies that a fluctuation of the rotational speed of the internal combustion engine has been detected. Overall, therefore, the continuous changing of the engine speed N has been recognized as a rotational speed fluctuation at the time point T4.

Finally, the binary signal BS will be reset to its low signal level if, for example, the count signal Z has again reached the value zero as is the case at time point T6, or if the throttle flap of the engine suddenly reopens, that is, the engine leaves the idling condition as shown in broken lines at time point T5.

Various possibilities exist for the countermeasures that may be taken once a rotational speed fluctuation is detected. Some are disclosed, for example, in the patent and patent application initially referred to. A specific possibility which is indicated in the time diagrams of the drawing is to alter the control parameters such that the rotational speed N of the internal combustion engine is damped. This becomes particularly apparent from the third diagram (c) illustrating the count signal Z in which the decrease of this count signal occurs substantially more slowly after a rotational speed fluctuation has been detected than in an operating condition in which no rotational speed fluctuation occurs.

The simplest way of realizing the method described is by means of a suitably programmed computer, for example, a microprocessor. With a programmed computer, the count signal, for example, can be generated by means of interrupt signals which permits a particularly simple modification of the time constant of the count signal. The use of a computer also provides the advantage of permitting the signal indicative of an open or closed throttle flap to be generated by means of an appropriate interrupt signal. It is, however, also within the scope of one skilled in the art to realize the entire method by means of an analog circuit arrangement.

It is understood that the foregoing description is that of the preferred embodiments of the invention and that various changes and modifications may be made thereto without departing from the spirit and scope of the invention as defined in the appended claims.

What is claimed is:

1. A method for detecting fluctuations in the rotational speed of an internal combustion engine for which a sensor generates a signal indicative of the actual rotational speed of the engine, the method comprising the steps of:

detecting a downward crossover of the actual speed N of the engine through a single threshold level equal to the algebraic sum of a predeterminable desired rotational speed and a predeterminable deviation of the speed from said predeterminable desired rotational speed;

checking the time duration between two successive crossovers through said threshold level and determining if said time duration exceeds a predeterminable time duration; and evaluating the rotational speed of the engine as fluctuating when said time duration between two successive crossovers does not exceed said predeterminable time duration.

2. The method of claim 1, wherein said predetermined desired rotational speed is the idle rotational speed of the engine.

3. The method of claim 1, wherein the check of said time duration between two successive crossovers is realized with the aid of a counter.

4. The method of claim 1, wherein the operating parameters of the engine are changed after fluctuations in the rotational speed are detected.

5. The method of claim 1, wherein said method is utilized to control idle rotational speed of the engine.

* * * * *